United States Patent
Kowarz et al.

(10) Patent No.: US 6,663,788 B2
(45) Date of Patent: *Dec. 16, 2003

(54) METHOD FOR MANUFACTURING A MECHANICAL CONFORMAL GRATING DEVICE

(75) Inventors: Marek W. Kowarz, Rochester, NY (US); John A. Lebens, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 09/867,927

(22) Filed: May 30, 2001

(65) Prior Publication Data

US 2001/0024325 A1 Sep. 27, 2001

Related U.S. Application Data

(63) Continuation-in-part of application No. 09/491,354, filed on Jan. 26, 2000, now Pat. No. 6,307,663.

(51) Int. Cl.[7] .......................... C23F 1/00; H01B 13/00; B29D 11/00
(52) U.S. Cl. ................. 216/24; 216/13; 216/2
(58) Field of Search ................. 216/2, 13, 24; 437/927; 359/291–295, 213, 224, 226

(56) References Cited

U.S. PATENT DOCUMENTS

| | | | |
|---|---|---|---|
| 4,441,791 A | 4/1984 | Hornbeck | |
| 4,626,920 A | 12/1986 | Glenn | |
| 4,857,978 A | 8/1989 | Goldburt et al. | |
| 5,170,283 A | 12/1992 | O'Brien et al. | |
| 5,311,360 A | 5/1994 | Bloom et al. | |
| 5,459,610 A | 10/1995 | Bloom et al. | |
| 5,661,592 A | * 8/1997 | Bornstein et al. | 359/291 |
| 5,677,783 A | * 10/1997 | Bloom et al. | 359/224 |
| 5,841,579 A | * 11/1998 | Bloom et al. | 359/572 |
| 5,844,711 A | 12/1998 | Long, Jr. | |
| 5,982,553 A | 11/1999 | Bloom et al. | |
| 6,238,581 B1 | * 5/2001 | Hawkins et al. | 216/13 |
| 6,301,000 B1 | 10/2001 | Johnson | |

OTHER PUBLICATIONS

H. Roder et al., "Full–colour diffraction–based optical system for light–valve projection displays", *Displays 16*, 1995, pp. 27–34.

W. Brinker et al., "Metallized viscoelastic control layers for light–value projection displays," *Displays 16*, 1995, pp. 13–20.

* cited by examiner

Primary Examiner—Parviz Hassanzadeh
Assistant Examiner—Roberts P Culbert
(74) Attorney, Agent, or Firm—Stephen H. Shaw

(57) ABSTRACT

A method of manufacturing a conformal grating device, that includes the steps of: forming a spacer layer on a substrate; removing portions of the spacer layer to define an active region with at least two channels and at least one intermediate support; forming a sacrificial layer in the active region; forming conductive reflective ribbon elements over the active region; and removing the sacrificial layer from the active region.

29 Claims, 13 Drawing Sheets

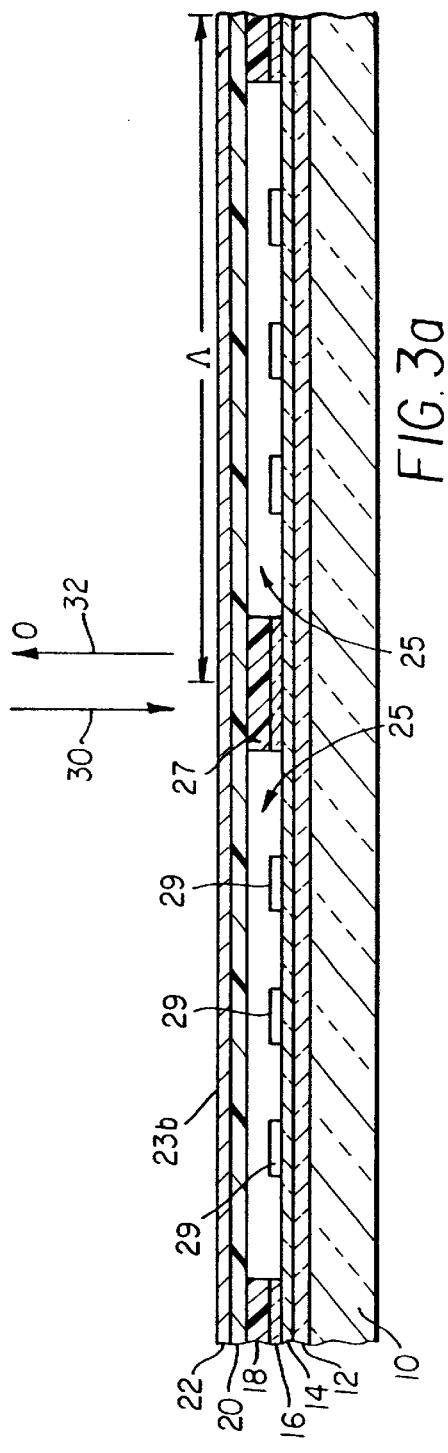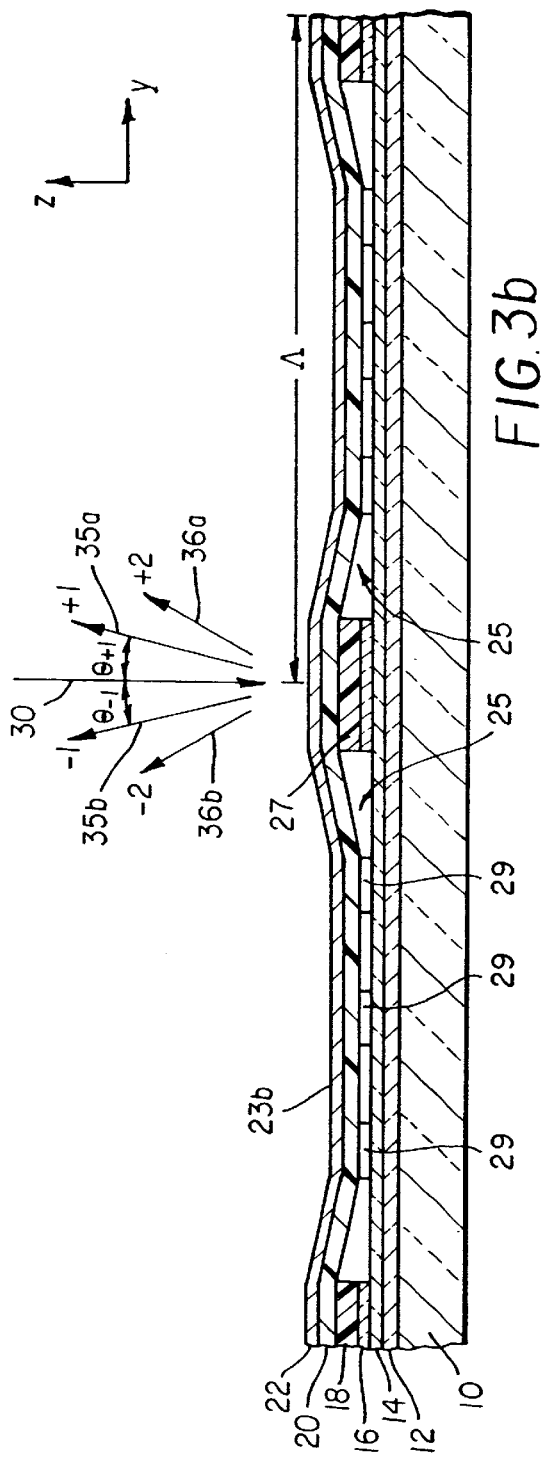

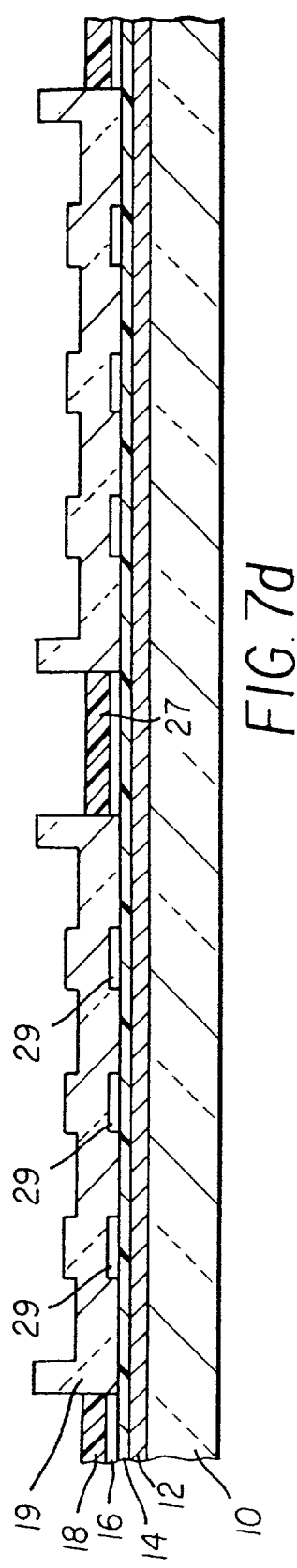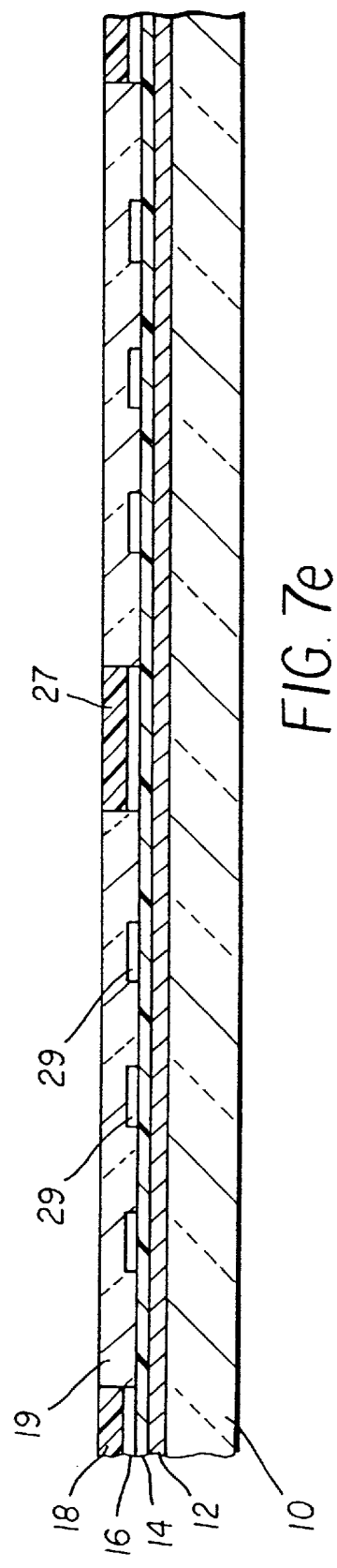

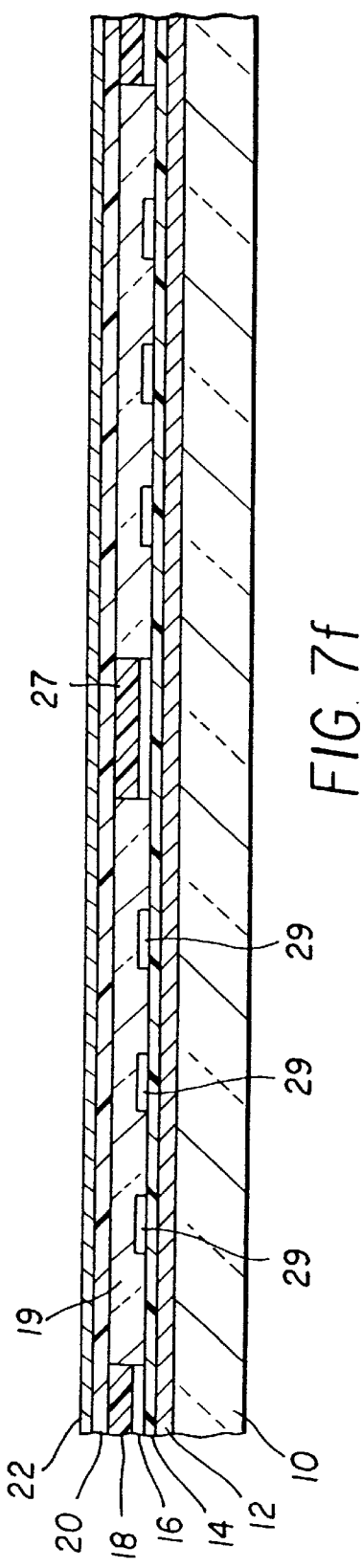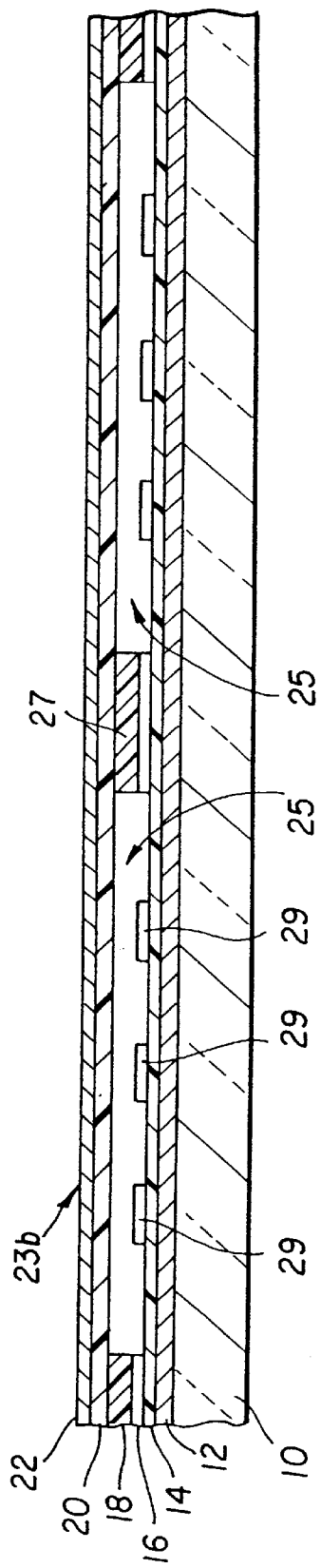

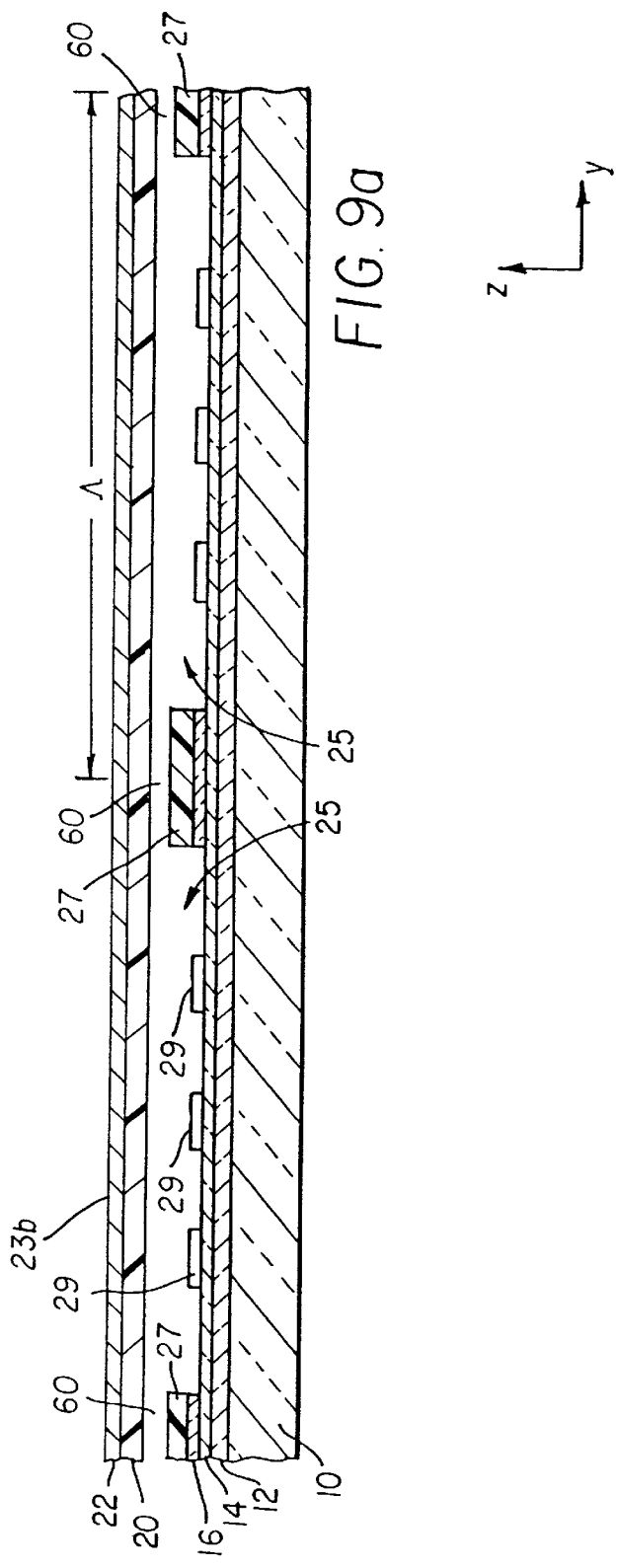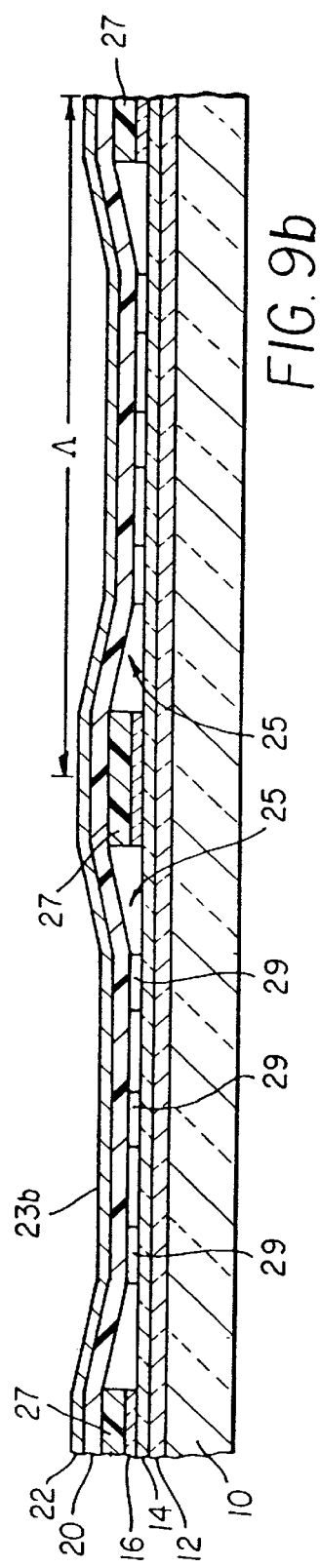

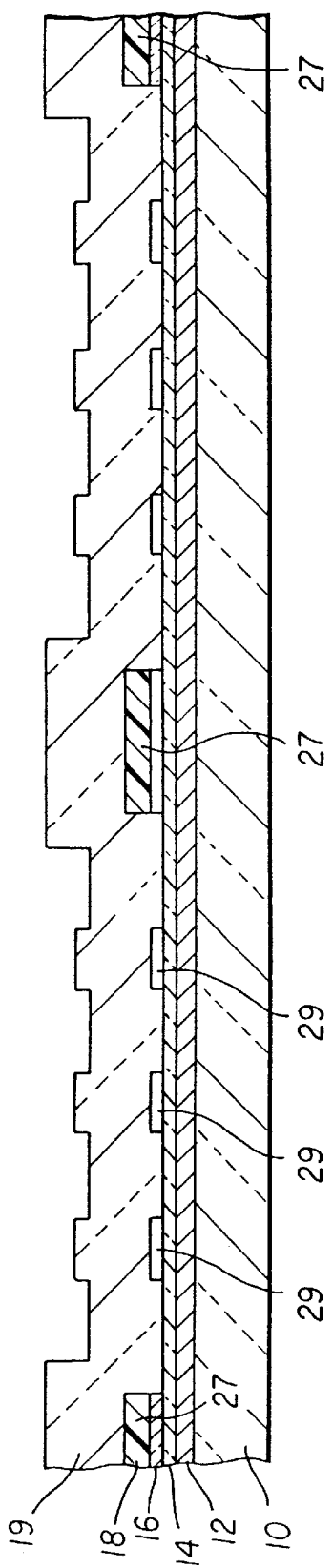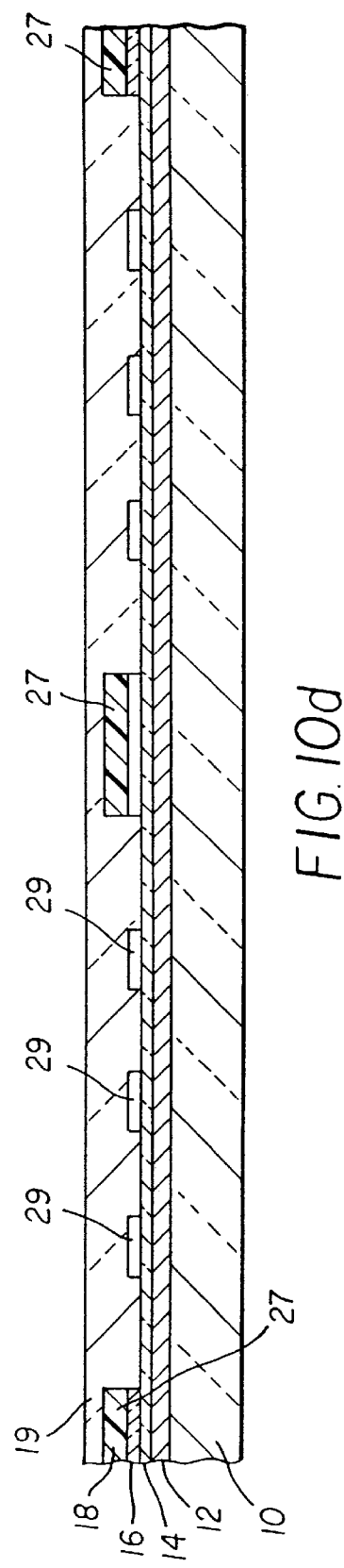

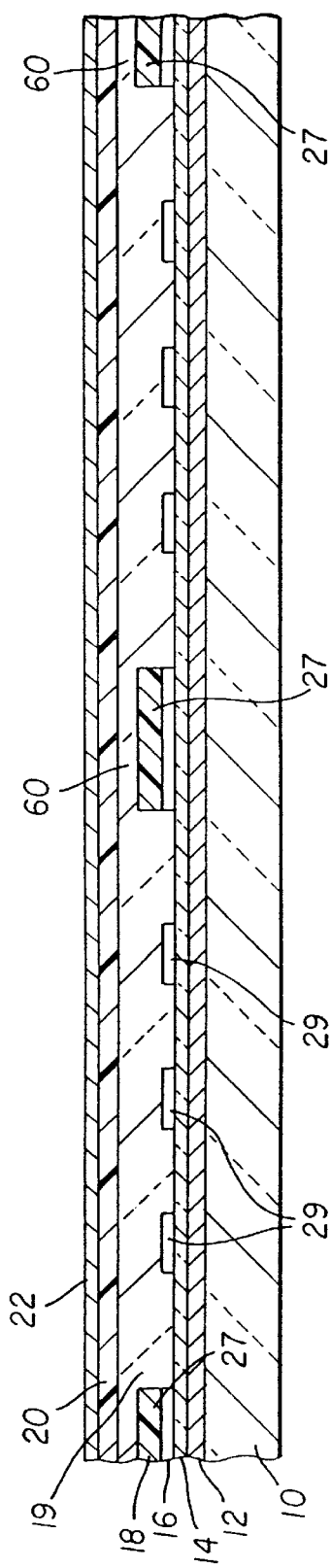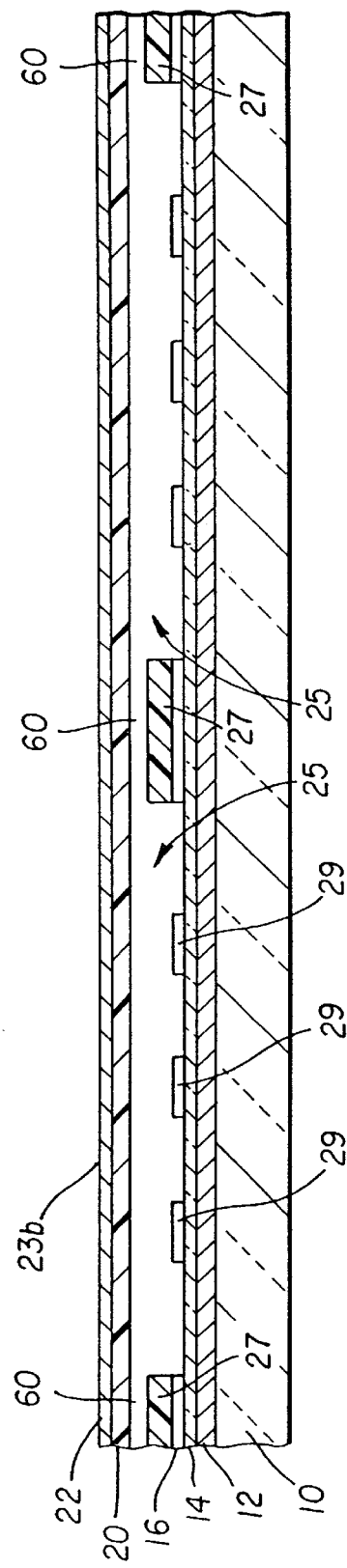

METHOD FOR MANUFACTURING A MECHANICAL CONFORMAL GRATING DEVICE

CROSS REFERENCE TO RELATED APPLICATION

This is a continuation-in-part Ser. No. 09/491,354, filed on Jan. 26, 2000 of U.S. Pat. No. 6,307,663, issued Oct. 23, 2001, entitled Spatial Light Modulator with Conformal Grating Elements, by Kowarz.

FIELD OF THE INVENTION

This invention relates to the fabrication of a micromechanical device for spatially and temporally modulating an incident beam of light by diffraction. More particularly, this invention discloses a method for manufacturing an electromechanical device with a conformal grating structure.

BACKGROUND OF THE INVENTION

Electromechanical spatial light modulators with a variety of designs have been used in applications such as display, optical processing, printing, optical data storage and spectroscopy. These modulators produce spatial variations in the phase and/or amplitude of an incident light beam using arrays of individually addressable devices.

One class of electromechanical spatial light modulators has devices with a periodic sequence of reflective elements that form electromechanical phase gratings. In such devices, the incident light beam is selectively reflected or diffracted into a number of discrete orders. Depending on the application, one or more of these diffracted orders may be collected and used by the optical system. Electromechanical phase gratings can be formed in metallized elastomer gels; see U.S. Pat. No. 4,626,920, issued Dec. 2, 1986 to Glenn, and U.S. Pat. No. 4,857,978, issued Aug. 15, 1989 to Goldburt et al. The electrodes below the elastomer are patterned so that the application of a voltage deforms the elastomer producing a nearly sinusoidal phase grating. These types of devices have been successfully used in color projection displays.

An electromechanical phase grating with a much faster response time can be made of suspended micromechanical ribbon elements, as described in U.S. Pat. No. 5,311,360, issued May 10, 1994, to Bloom et al. This device, also known as a grating light valve (GLV), can be fabricated with CMOS-like processes on silicon. Improvements in the device were later described by Bloom et al. that included: 1) patterned raised areas beneath the ribbons to minimize contact area to obviate stiction between the ribbons and the substrate, and 2) an alternative device design in which the spacing between ribbons was decreased and alternate ribbons were actuated to produce good contrast. See U.S. Pat. No. 5,459,610, issued Oct. 17, 1995. Bloom et al. also presented a method for fabricating the device; see U.S. Pat. No. 5,677,783, issued Oct. 14, 1997. Additional improvements in the design and fabrication of the GLV were described in U.S. Pat. No. 5,841,579, issued Nov. 24, 1998 to Bloom et al., and in U.S. Pat. No. 5,661,592, issued Aug. 26, 1997 to Bornstein et al.

Previously mentioned linear GLV arrays have a diffraction direction that is not perpendicular to the array direction, and thus increases the complexity of the optical system required for separating the diffracted orders. Furthermore, the active region of the array is relatively narrow, hence requiring good alignment of line illumination over the entire length of the array, typically to within 10–30 microns over a few centimeters of length. The line illumination then also needs to be very straight over the entire linear array.

There is a need, therefore, for a linear array of grating devices that has a large active region with the diffraction direction perpendicular to the array direction. Furthermore, the device must be able to diffract light efficiently at high speed into discrete orders and the device fabrication must be compatible with CMOS-like processes.

SUMMARY OF THE INVENTION

The need is met according to the present invention by providing a method of manufacturing a conformal grating device, that includes the steps of: forming a spacer layer on a substrate; removing portions of the spacer layer to define an active region with at least two channels and at least one intermediate support; forming a sacrificial layer in the active region; forming conductive reflective ribbon elements over the active region; and removing the sacrificial layer from the active region.

BRIEF DESCRIPTION OF THE DRAWINGS

FIGS. 3a and 3b are cross-sectional views through line 3,7,9,10—3,7,9,10 in FIG. 2, showing the operation of an electromechanical conformal grating device in an unactuated state and an actuated state, respectively;

FIG. 7d is a cross-sectional view through line 3,7,9,10—3,7,9,10 in FIG. 2 illustrating patterning of the sacrificial layer;

FIG. 7e is a cross-sectional view through line 3,7,9,10—3,7,9,10 in FIG. 2 illustrating planarizing of the sacrificial layer;

FIG. 7f is a cross-sectional view through line 3,7,9,10—3,7,9,10 in FIG. 2 illustrating deposition of a ribbon layer and a reflective and conductive layer;

FIG. 7g is a cross-sectional view through line 3,7,9,10—3,7,9,10 in FIG. 2 illustrating removal of the sacrificial layer after patterning elongated ribbon elements;

FIG. 9a is a cross sectional view of an alternative embodiment of the conformal grating device in an unactuated state; and FIG. 9b is a cross sectional view of an alternative embodiment of the conformal grating device in an actuated state.

FIGS. 10a–10f illustrate the fabrication steps used to make an alternative embodiment of the conformal grating device.

DETAILED DESCRIPTION OF THE INVENTION

Figure 1:
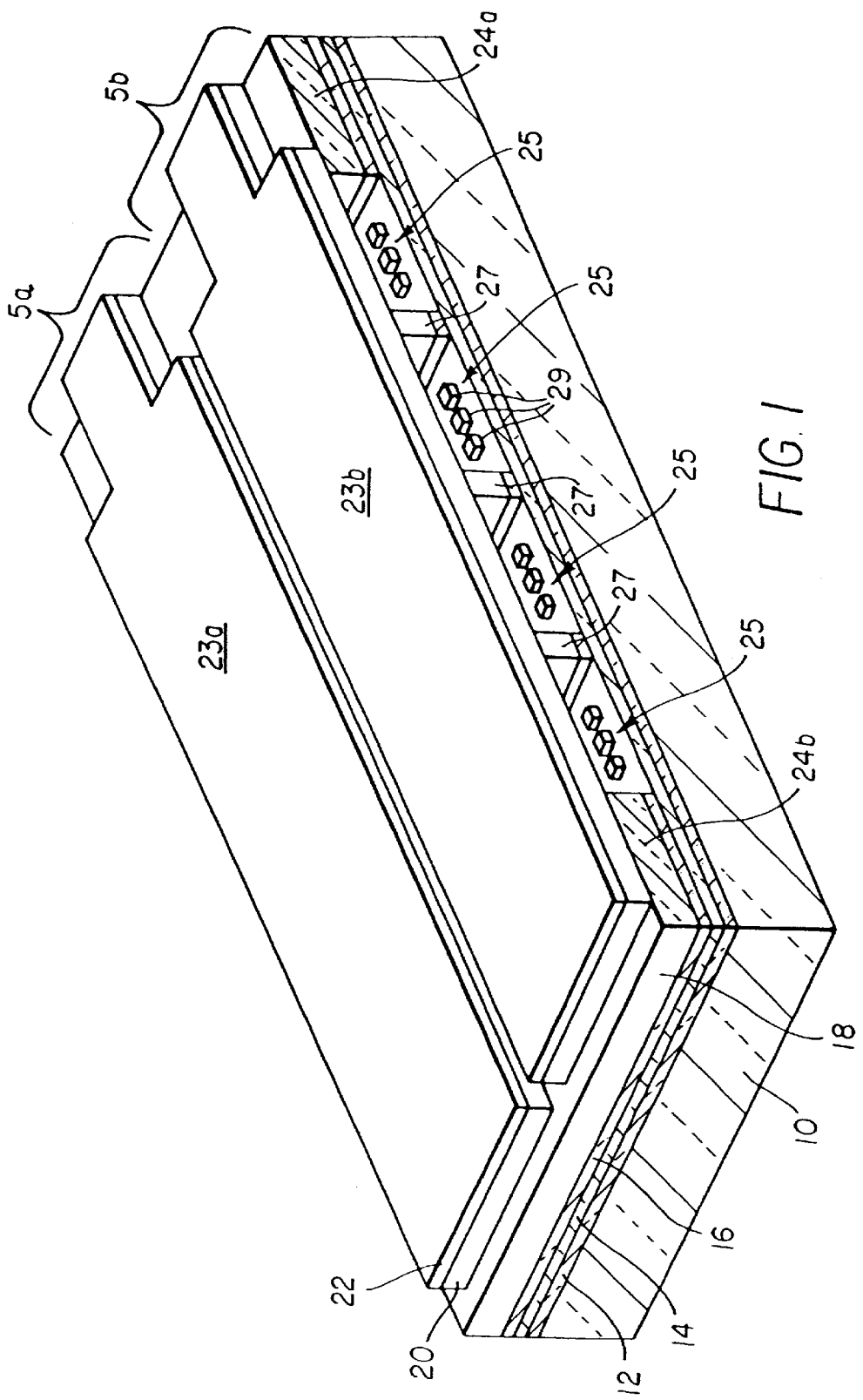
FIG. 1 is a perspective, partially cut-away view of a spatial light modulator with electromechanical conformal grating devices, showing two devices in a linear array.

The conformal grating devices of the preferred embodiment of the present invention are illustrated in FIGS. 1–2, 3a–3b, and 4a–4b. FIG. 1 shows the structure of two side-by-side conformal grating devices 5a and 5b in an unactuated state. In this embodiment, the devices can be operated by the application of an electrostatic force. A substrate 10 made of glass, metal, plastic, or semiconductor materials, is covered by a bottom conductive layer 12. The grating devices 5a and 5b are formed on top of the bottom conductive layer 12 and the substrate 10. The bottom conductive layer 12 acts as an electrode to actuate the devices. The bottom conductive layer 12 can be made of materials such as aluminum, titanium, gold, silver, tungsten, doped silicon, or indium tin oxide. A dielectric protective layer 14 covers the bottom conductive layer 12. Above the protective layer 14 a standoff layer 16 is formed which is followed by a spacer layer 18. On top of the spacer layer 18, a ribbon layer 20 is formed which is covered by a reflective layer 22. In the present embodiment, the reflective layer 22 is also a conductor in order to provide electrodes for the actuation of the conformal grating devices 5a and 5b. The reflective and conductive layer 22 is patterned to provide electrodes to the two conformal grating devices 5a and 5b. The ribbon layer 20 preferably comprises a material with a sufficient tensile stress to provide a large restoring force. Examples of ribbon materials are silicon nitride, titanium aluminide, and titanium oxide. The thickness and tensile stress of the ribbon layer 20 are chosen to optimize performance by influencing the electrostatic force for actuation and the restoring force. These forces affect the voltage requirement, speed, and resonance frequency of the conformal grating devices 5a and 5b.

Each of the two devices 5a and 5b has an associated elongated ribbon element 23a and 23b, respectively, patterned from the reflective and conductive layer 22 and the ribbon layer 20, and herein referred to as conductive reflective ribbon elements. The elongated-conductive reflective ribbon elements 23a and 23b are supported by end supports 24a and 24b formed from the spacer layer 18 and by one or more intermediate supports 27. In FIG. 1, three intermediate supports 27 are shown formed from the spacer layer 18. These intermediate supports 27 are uniformly separated in order to form four equal-width channels 25. The conductive reflective ribbon elements 23a and 23b are secured to the end supports 24a and 24b and to the intermediate supports 27. The end supports 24a and 24b are not defined other than at their edges facing the channel 25. A plurality of square standoffs 29 is patterned at the bottom of the channels 25 from the standoff layer 16. These standoffs 29 reduce the possibility of the conductive reflective ribbon elements 23a, 23b sticking when actuated. The standoffs 29 may also be patterned in shapes other than square, for example, rectangular or round.

Figure 2:
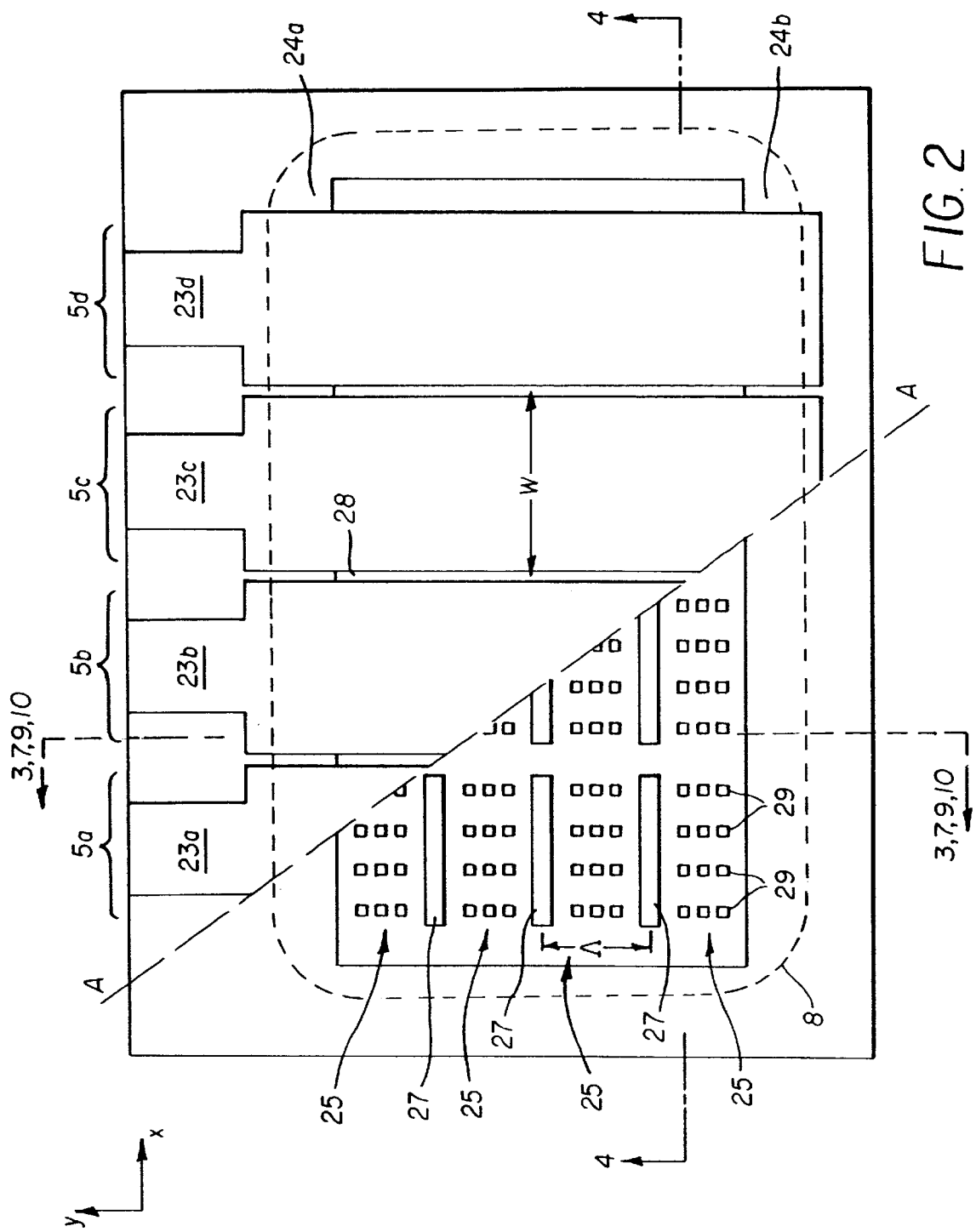
FIG. 2 is a top view of a spatial light modulator with electromechanical conformal grating devices, showing four individually operable devices in a linear array.

A top view of a four-device linear array of conformal grating devices 5a, 5b, 5c and 5d is shown in FIG. 2. The conductive reflective ribbon elements 23a, 23b, 23c, and 23d are depicted partially removed over the portion of the diagram below the line A—A in order to show the underlying structure. For best optical performance and maximum contrast, the intermediate supports 27 must be completely hidden below the conductive reflective ribbon elements 23a, 23b, 23c and 23d. Therefore, when viewed from the top, the intermediate supports 27 must not be visible in the gaps 28 between the conformal grating devices 5a–5d. Here each of the conformal grating devices has three intermediate supports 27 with four equal-width channels 25. The active region 8 is the portion of the device where the electromechanical actuation takes place and contains the channels 25, the intermediate supports 27, and the end supports 24a and 24b. The active region 8 is completely covered by the ribbon layer 20 in the form of the elongated-conductive reflective ribbon elements 23a, 23b, 23c, and 23d.

The center-to-center separation Λ of the intermediate supports 27 defines the period of the conformal grating devices in the actuated state. The conductive reflective ribbon elements 23a–23d are mechanically and electrically isolated from one another, allowing independent operation of the four conformal grating devices 5a–5d. The bottom conductive layer 12 of FIG. 1 can be common to all of the devices.

FIG. 3a is a side view, through line 3,7,9,10—3,7,9,10 of FIG. 2, of two channels 25 of the conformal grating device 5b in the unactuated state. FIG. 3b shows the same view of the actuated state. For operation of the device, an attractive electrostatic force is produced by applying a voltage difference between the bottom conductive layer 12 and the reflective and conductive layer 22 of the conductive reflective ribbon element 23b. In the unactuated state (see FIG. 3a), with no voltage difference, the ribbon element 23b is suspended flat between the end supports 24a, 24b. In this state, an incident light beam 30 is primarily reflected 32 into the mirror direction. To obtain the actuated state, a voltage is applied to the conformal grating device 5b, which deforms the conductive reflective ribbon element 23b and produces a partially conformal grating with period Λ. FIG. 3b shows the device in the fully actuated state with the conductive reflective ribbon element 23b in contact with the standoffs 29. The height difference between the bottom of element 23b and the top of the standoffs 29 is chosen to be approximately ¼ of the wavelength λ of the incident light. The optimum height depends on the specific shape of the actuated device. In the actuated state, the incident light beam 30 is primarily diffracted into the +1st order 35a and −1st order 35b, with additional light diffracted into the +2nd order 36a and −2nd order 36b. A small amount of light is diffracted into even higher orders and some is reflected. For light incident perpendicular to the surface of the device, the angle θm between the incident beam and the mth order diffracted beam is given by $$\sin \theta_m = m\lambda/\Lambda,$$

where m is an integer. One or more of the diffracted orders can be collected and used by the optical system, depending on the application. When the applied voltage is removed, the forces due to the tensile stress and bending restores the ribbon element 23b to its original unactuated state.

Figure 4A:
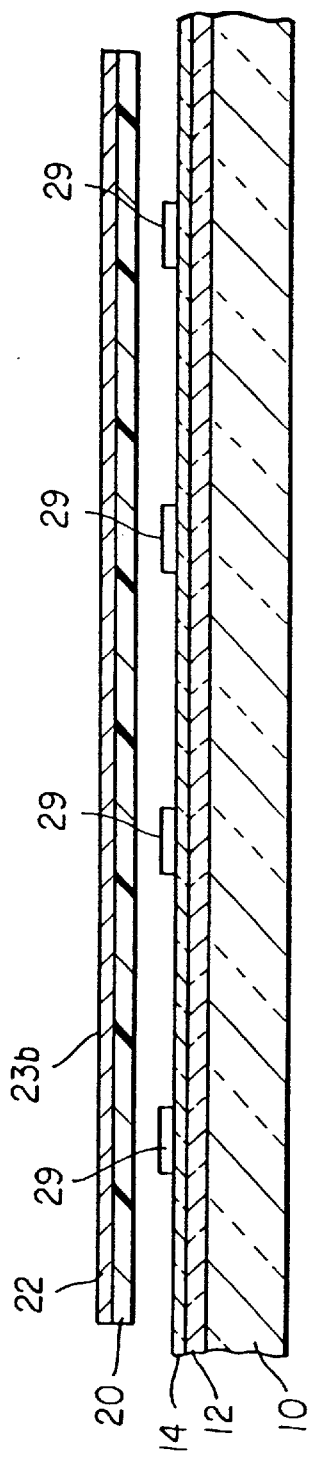
FIGS. 4a and 4b are cross-sectional views through line 4—4 in FIG. 2 showing the device in an unactuated state and an actuated state, respectively.
Figure 4B:
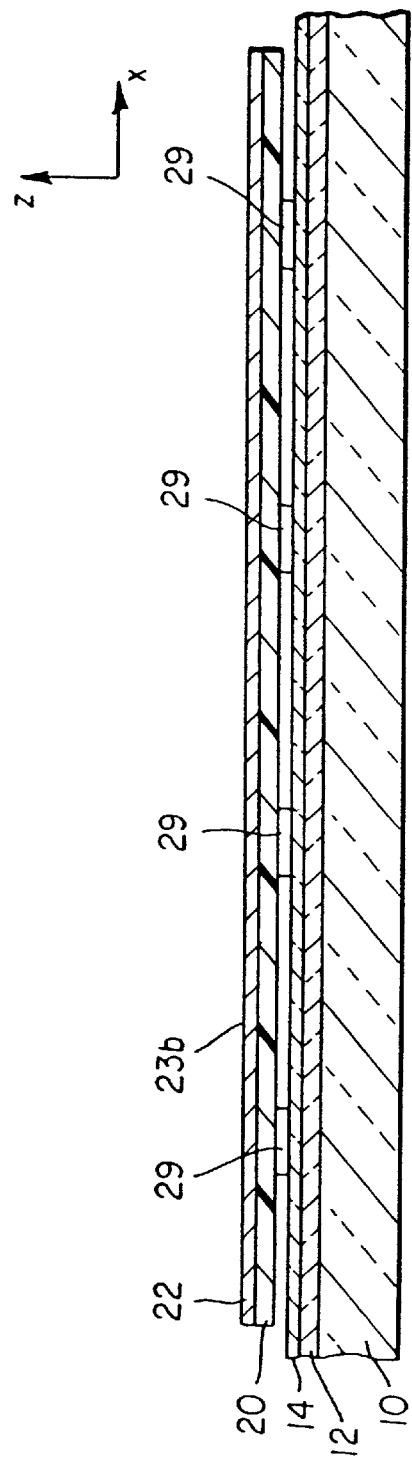

FIGS. 4a and 4b show a rotated side view through line 4—4 of FIG. 2 of the conformal grating device 5b in the unactuated and actuated states, respectively. The conductive reflective ribbon element 23b is suspended by the end support 24b and the adjacent intermediate support 27 (not shown in this perspective). The application of a voltage actuates the device as illustrated in FIG. 4b.

To understand the electromechanical and optical operation of the conformal grating device in more detail, it is helpful to examine the expected performance of a realistic design with the following materials and parameters:

Substrate material: silicon

Bottom conductive layer: doped silicon

Protective layer: silicon dioxide, thickness=50 nm

Spacer layer: silicon dioxide, thickness=150 nm

Ribbon layer: silicon nitride, thickness=100 nm, tensile stress=600 Mpa

Reflective and conductive layer: aluminum, thickness=50 nm

Grating period $\Lambda$=20 $\mu$m

Suspended length of conductive reflective ribbon element=16 $\mu$m

Width of conductive reflective ribbon element w=30 $\mu$m

Width of intermediate supports=4 $\mu$m

This type of design allows for fabrication with CMOS methods and integration with CMOS circuitry. The resonant frequency of the ribbon elements in this particular design is approximately 11 MHz. Most practical designs have resonant frequencies between 2 MHz and 15 MHz. Because of this high resonance, the switching time of the device can be very short.

Figure 5:
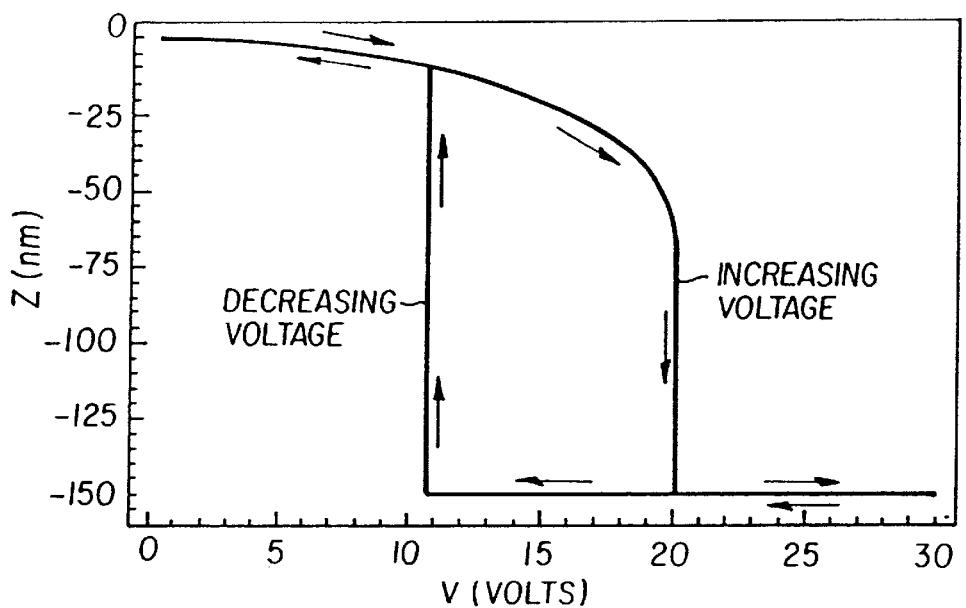
FIG. 5 is a plot showing ribbon element position as a function of applied voltage.
Figure 6:
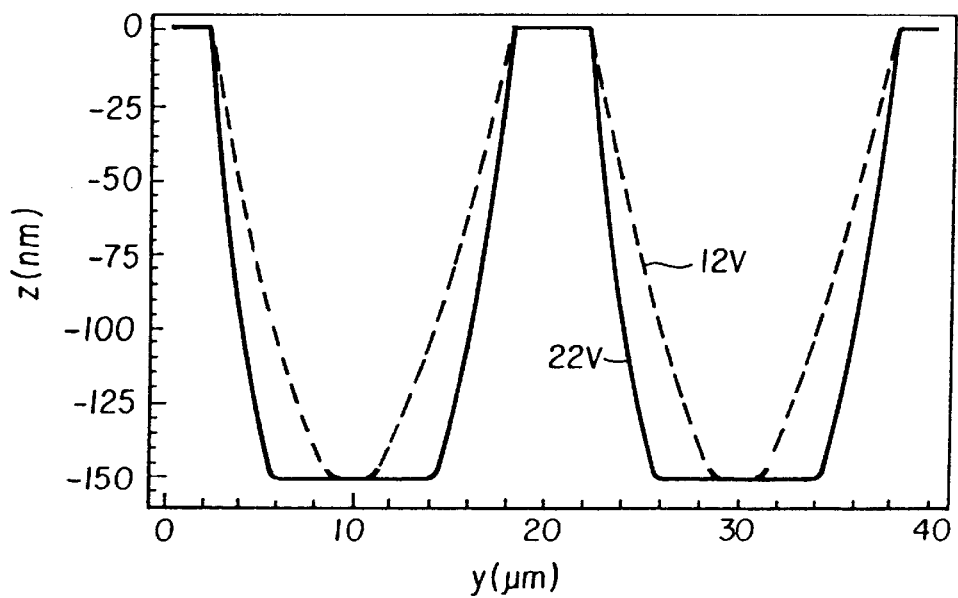
FIG. 6 is a diagram showing the device profile in response to two different actuation voltages.

FIGS. 5 and 6 show the modeled electromechanical operation of this particular device. FIG. 5 is a plot of the position of the conductive reflective ribbon element at the center of a channel as a function of applied voltage, illustrating the associated hysteresis. As the voltage is increased from 0 V, the center displacement increases in approximately a quadratic manner until the pull-down voltage of 20.1 V is reached. At this voltage, the electrostatic force overcomes the tensile restoring force and the ribbon slams into the substrate. Further increasing the applied voltage changes the shape of the deformed ribbon, but cannot change the center position. With the ribbon in contact with the substrate, the voltage can be reduced below the pull-down value while maintaining contact, until release at 10.8 V. This hysteresis can be exploited to improve the optical performance of the device. It can also be used as a switch in certain applications.

FIG. 6 demonstrates how the grating profile may be modified by adjusting the applied voltage. The profile of two periods of the actuated device is shown at 12 V (dotted line) and at 22 V (solid line), with the ribbon and substrate in contact. To obtain this 12 V profile, contact must first be established by applying a value larger than the pull-down voltage of 20.1 V. Because 12 V is only slightly larger that the release voltage, only a small portion of the ribbon touches the substrate. This change in shape with voltage has an important impact on the diffraction efficiency of the device.

Figure 7A:
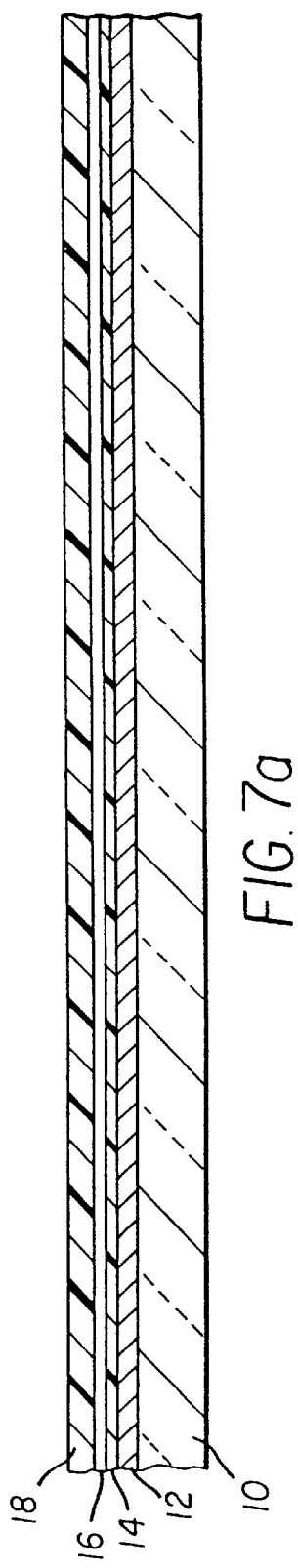
FIG. 7a is a cross-sectional view through line 3,7,9,10—3,7,9,10 in FIG. 2 illustrating the layer structure prior to any patterning.

The fabrication sequence for making a conformal grating device is illustrated in FIGS. 7a–7g. Referring now to FIG. 7a, which is a cross-sectional view along line 3,7,9,10—3,7,9,10 indicated in FIG. 2, illustrated is the built-up layer of one embodiment of the invention with standoffs 29 formed at the bottom of the channels 25. The device is built upon a substrate 10, covered by the bottom conductive layer 12, and a dielectric protective layer 14 on top of the bottom conductive layer 12. As mentioned above, the substrate 10 can be glass, plastic, metal, or a semiconductor material. In one embodiment, the substrate 10 is silicon and the dielectric protective layer 14 is a thermal oxide. An epitaxial layer, doping by diffusion, or ion implantation can form the bottom conductive layer 12. To form the standoffs 29 and channels 25, a standoff layer 16 is deposited followed by a spacer layer 18. The spacer layer 18 is selected from the group consisting of silicon oxide, silicon nitride polysilicon, and polyimide. In a preferred embodiment the standoff layer 16 is silicon nitride deposited by chemical vapor deposition. The top surface of the standoff layer 16 will be used to define an actuation height resulting from operation. In another embodiment, the spacer layer 18 is silicon oxide deposited by chemical vapor deposition. The total height of the actuation of the elongated-conductive reflective ribbon elements 23a–23d is defined by the thickness of the spacer layer 18.

Figure 7B:
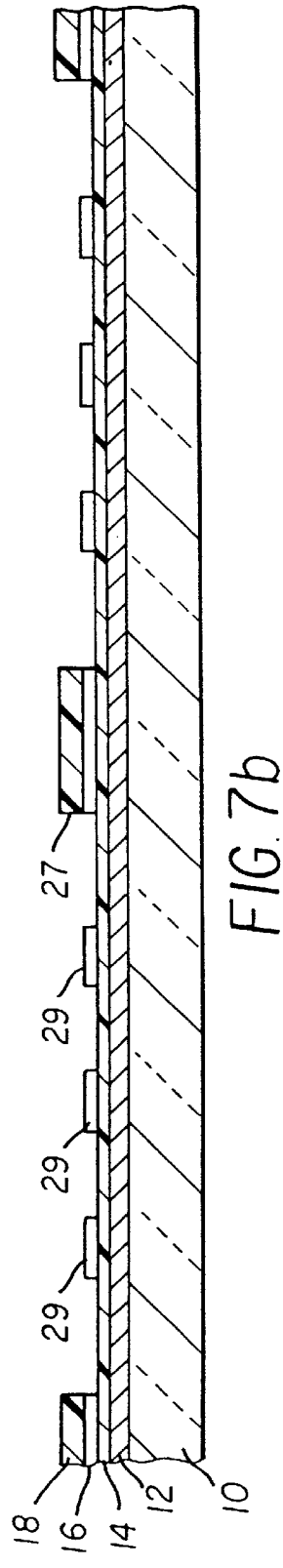
FIG. 7b is a cross-sectional view through line 3,7,9,10—3,7,9,10 in FIG. 2 illustrating patterning of the active region to form channels and intermediate supports.

Referring now to FIG. 7b, which is a cross-sectional view along line 3,7,9,10—3,7,9,10 indicated in FIG. 2, etching of the channels 25 to form the intermediate supports 27 is illustrated. The patterning of the spacer layer 18 is carried out using standard photolithographic processing and etching methods to define the active region 8 where the channels 25 and intermediate supports 27 are located. The etching of the oxide spacer layer uses chemistry designed to stop on the silicon nitride standoff layer 16. The standoff layer 16 is then patterned using photolithographic processing and etching methods to produce the standoffs 29, as illustrated in FIG. 7b. The standoffs 29 act as mechanical stops for the actuation of the conformal grating device. The actuated elongated-conductive reflective ribbon elements 23a–23d come into contact with the surface standoffs 29.

Figure 7C:
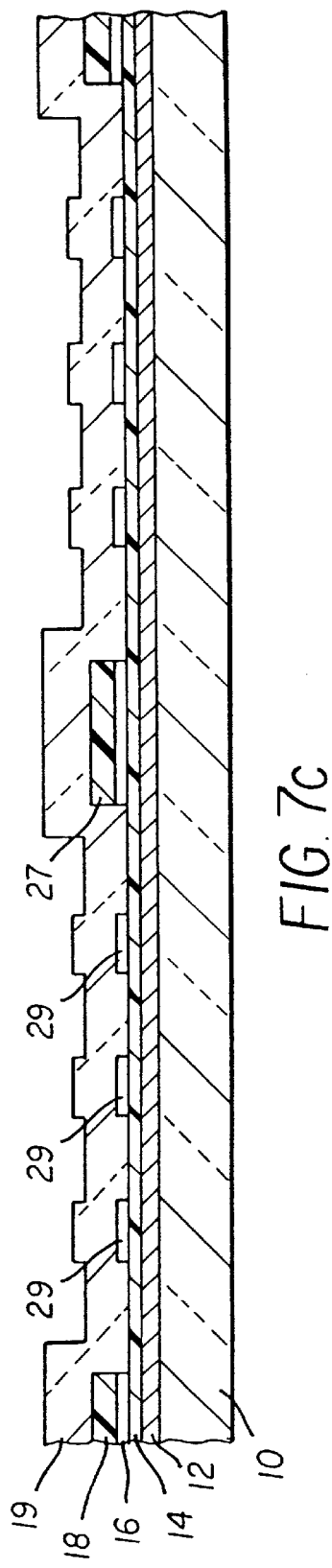
FIG. 7c is a cross-sectional view through line 3,7,9,10—3,7,9,10 in FIG. 2 illustrating deposition of a sacrificial layer.

Referring now to FIG. 7c, which is a cross-sectional view along line 3,7,9,10—3,7,9,10 indicated in FIG. 2, the deposition of a sacrificial layer 19 is illustrated. To allow additional layers atop the existing structure, as shown in FIG. 7c, a conformal sacrificial layer 19 is deposited to a thickness greater than the sum of the thickness of the standoff layer 16 and the spacer layer 18. The material for the sacrificial layer 19 is different from the spacer layer 18 and is selected from the group consisting of silicon oxide, silicon nitride, polysilicon, doped-polysilicon, silicon-germanium alloys, and polyimide. In one embodiment, the sacrificial layer 19 is polysilicon deposited by chemical vapor deposition.

Referring now to FIG. 7d, which is a cross-sectional view along line 3,7,9,10—3,7,9,10 indicated in FIG. 2, the patterning of the sacrificial layer 19 is illustrated. The patterning of the sacrificial layer 19 is carried out using standard photolithographic processing and a mask which is the reverse of the mask used to etch the spacer layer 18 defining the active region 8 where the channels 25 and intermediate supports 27 are located. The mask can be biased to account for misalignment. The sacrificial layer 19 is then completely removed from the intermediate supports 27 and the areas outside of the active region 8. The removal of the sacrificial layer 19 outside of the active region 8 improves the uniformity of the planarization step described below. The removal of the sacrificial layer 19 may be done prior to providing the ribbon layer 20. This removal process ensures good mechanical attachment of the elongated-conductive reflective ribbon elements 23a–23d to the intermediate supports 27 and the end supports 24a and 25b (not shown in FIG. 7d).

Referring now to FIG. 7e, which is a cross-sectional view along line 3,7,9,10—3,7,9,10 indicated in FIG. 2, the planarization of the sacrificial layer 19 to a level substantially near the top surface of the intermediate supports 27 is illustrated. Chemical mechanical polishing methods are used to achieve the polished structure. The polished surface of sacrificial layer 19 filling the channels 25 is preferably polished to be optically coplanar with the top surface of the intermediate supports 27. As is well known in the practice of optical engineering, this requires a surface planarity of less than about 200 Angstrom units at visible wavelengths.

Referring now to FIG. 7f, which is a cross-sectional view along line 3,7,9,10—3,7,9,10 indicated in FIG. 2, deposition of the ribbon layer 20 and of the reflective and conductive layer 22 to illustrate. The ribbon layer 20 is provided on top of the optically-coplanar sacrificial layer 19 and intermediate supports 27, thereby also covering the entire active region 8 of the device. Silicon nitride is a well-suited material for the ribbon layer 20 and can be patterned to provide the needed mechanical structure. Its material properties are well suited for the application because of the intrinsic tensile stress easily controlled by the deposition process. In a preferred alternative embodiment titanium aluminide is used as the ribbon layer 20 material. Its material properties are well suited for the application because its intrinsic tensile stress is easily controlled by sputter deposition and annealing. Titanium aluminide is also electrically conducting. The reflective and conductive layer 22 deposited atop the ribbon layer 20 needs to have good electric conducting properties. The light reflecting properties of the reflective and conductive layer 22 improve the efficiency of diffraction so as to maximize the diffracted light and minimize loss of light by absorption. The material for the reflective and conductive layer 22 is selected from the group consisting of aluminum, titanium, gold, silver, tungsten, silicon alloys, and indium tin oxide.

Electrical contact to the bottom conductive layer can be made from the back side through the substrate 10 if the substrate is electrically conductive. Alternatively electrical contact can be made on the front side by photolithographically patterning areas outside the active region (not shown) and etching through the spacer layer 18, standoff layer 16 and dielectric protective layer 14.

The elongated-conductive reflective ribbon elements 23a–23d are now patterned from the ribbon layer 20 and the reflective and conductive layer 22 using photolithographic processing and etching. This etching process defines the top-view geometry of the elongated-conductive reflective ribbon elements 23a–23d shown in FIGS. 1 and 2.

Referring now to FIG. 7g, which is a cross-sectional view along line 3,7,9,10—3,7,9,10 indicated in FIG. 2, the removal of the sacrificial layer 19 from within the active region 8 to form channels 25 and intermediate supports 27 is illustrated. In one embodiment, the sacrificial layer 19 is polysilicon which can be selectively removed by dry etching methods using xenon difluoride to yield the cross-sectional view illustrated in FIG. 7g. The gas has access to the sacrificial layer 19 through the gaps 28 between the elongated-conductive reflective ribbon elements 23a–23d. The removal of the sacrificial layer 19 is the final step needed to produce operational conformal grating devices 5a–5d. The devices can now be actuated to operate as described earlier. After removal of the sacrificial layer 19, the elongated-conductive reflective ribbon elements 23a–23d remain optically coplanar providing the ribbon layer 20 is deposited with uniform thickness and uniform tensile stress.

Figure 8:
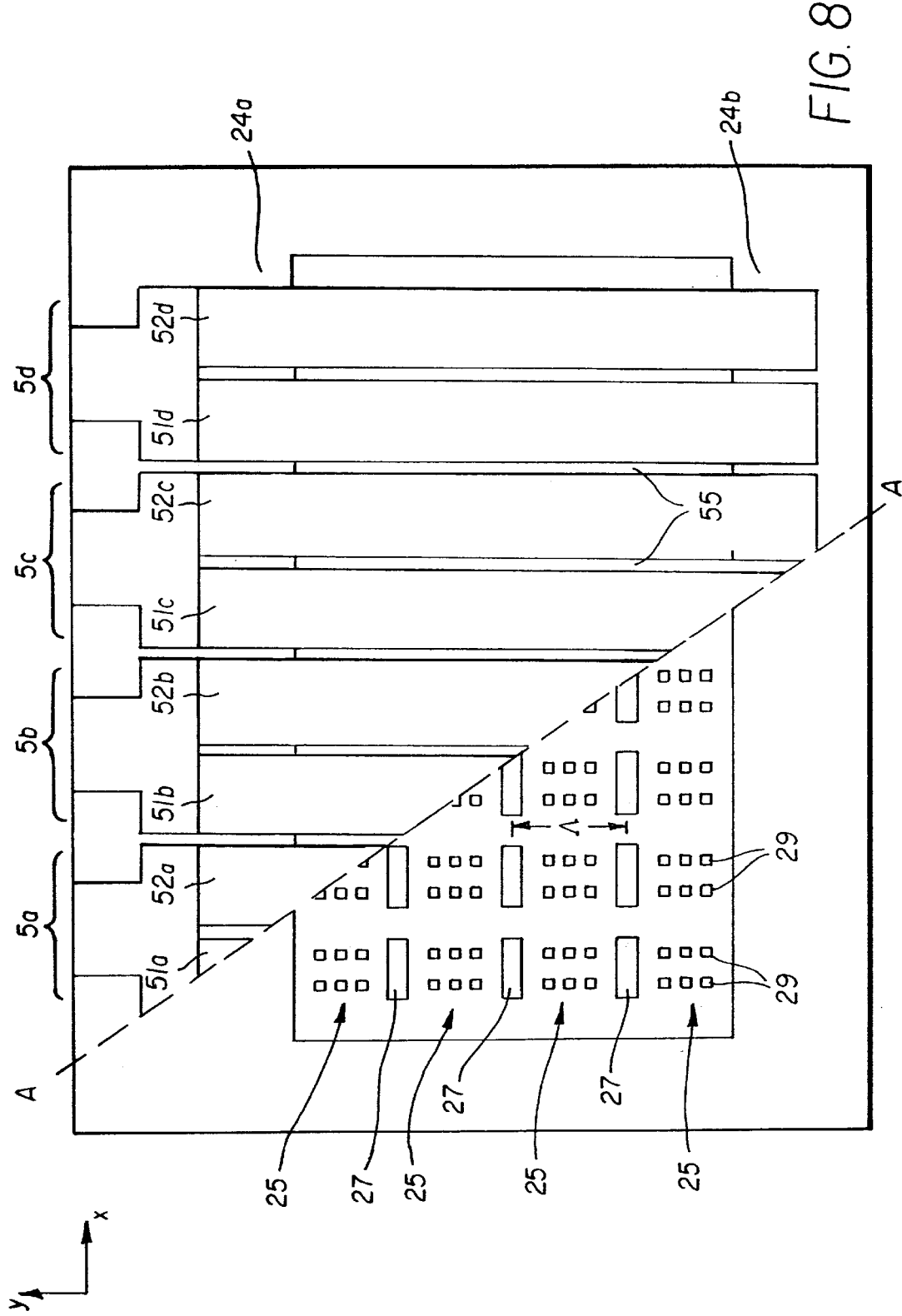
FIG. 8 is a top view of an alternate embodiment of the spatial light modulator.

An alternate embodiment of conformal grating devices is shown in FIG. 8, which depicts a top view of a four-device linear array similar to FIG. 2. Each of the conformal grating devices 5a, 5b, 5c and 5d now has an associated pair of subdivided elongated-conductive reflective ribbon elements (51a, 52a), (51b, 52b), (51c, 52c) and (51d, 52d), respectively. This subdivision of each device permits fabrication of wider devices without significantly impacting optical performance. The preferred method of fabrication is to etch a sacrificial layer from the channel, thus releasing the ribbon elements. The subdivided gaps 55 between the elements allow the etchant to access this sacrificial layer. Increasing the number of subdivided gaps 55 can therefore improve the etching process. In practice, it may be necessary to further subdivide the conformal grating devices into more than two. The conductive reflective ribbon elements are depicted partially removed over the portion of the diagram below the line A—A in order to show the underlying structure. For best optical performance and maximum contrast, the intermediate supports 27 must be completely hidden below the conductive reflective ribbon elements 51a, 52a, 51b, 52b, 51c, 52c, 51d and 52d. Therefore, when viewed from the top, the intermediate supports 27 must not penetrate into the subdivided gaps 55. The ribbon elements within a single conformal grating device are mechanically isolated, but electrically coupled. They therefore operate in unison when a voltage is applied.

The conformal grating devices described in the above embodiments have intermediate supports attached to the conductive reflective ribbon elements. To obtain very high contrast, these supports must be completely hidden when the devices are not actuated and the ribbon elements must be completely flat. However, in practice, the fabrication causes some nonuniformity in the profile of the ribbon element just above the intermediate supports. The nonuniformity produces a weak grating reducing the contrast of the device. FIGS. 9a and 9b show an alternate embodiment that reduces this problem. The side view is the same as in FIGS. 3a and 3b. FIG. 9a depicts the two channels 25 between the three intermediate supports 27 of the device in the unactuated state. FIG. 9b shows the same view of the actuated state. In the unactuated state, with no voltage applied to the device, the ribbon element 23b is suspended flat above the intermediate supports 27 by the two end supports 24a and 24b (see FIG. 2), leaving a small intermediate support gap 60 between the top of the intermediate supports 27 and the bottom of the ribbon element 23b. When a voltage is applied to actuate the device, the bottom of the ribbon element 23b makes contact with the top of the intermediate supports and a partially conforming grating is created. FIG. 9b shows the device in the fully actuated state with the conductive reflective ribbon element 23b also touching the standoffs 29.

Figure 10A:
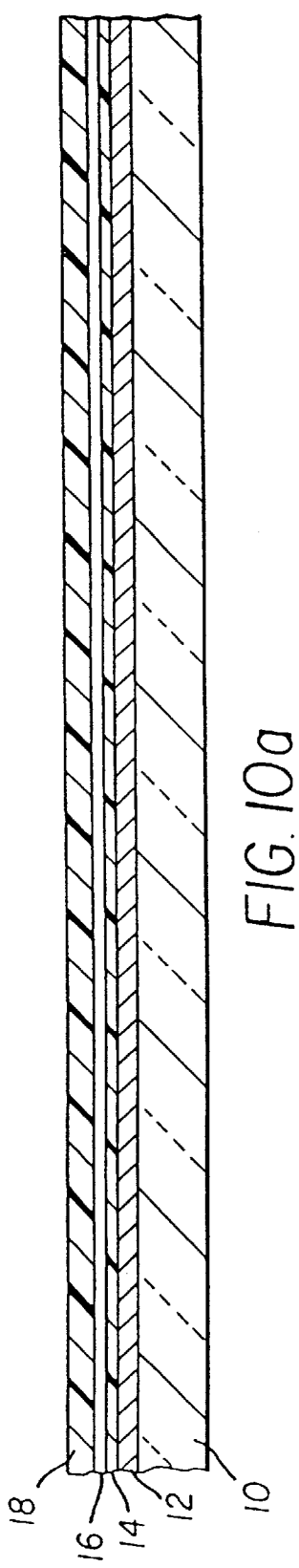

FIGS. 10a–10f illustrate the fabrication sequence for making the conformal grating device with elongated-conductive reflective ribbon elements suspended above intermediate supports. These figures show the same view of the device as FIGS. 9a and 9b. The first few steps are the same as the process of FIGS. 7a and 7b. Referring to FIG. 10a, the device is built upon a substrate 10, covered by the bottom conductive layer 12, and a dielectric protective layer 14 on top of the bottom conductive layer 12. To form the standoffs 29 and channels 25, a standoff layer 16 is deposited followed by a spacer layer 18.

Figure 10B:
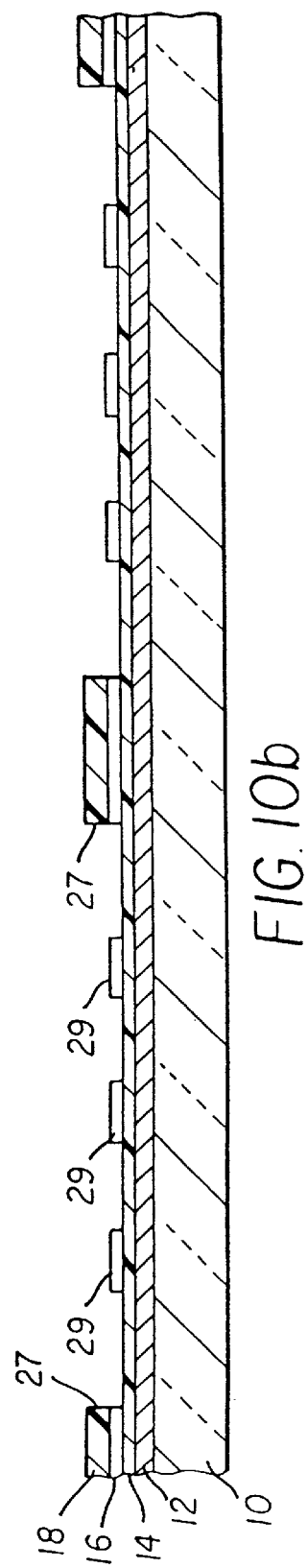

FIG. 10b illustrates etching of the channels 25 to form the intermediate supports 27. The patterning of the spacer layer 18 is carried out using standard photolithographic processing and etching methods to define the active region 8 where the channels 25 and intermediate supports 27 are located. The standoff layer 16 is then patterned using photolithographic processing and etching methods to produce the standoffs 29, as illustrated in FIG. 10b.

In order to generate an intermediate support gap 60 with a desired height, the end supports 24a and 24b can be fabricated to be higher than the intermediate supports 27 (not shown in FIG. 10b). This step can be performed by depositing and patterning a support layer made, for example, of silicon nitride to increase the height of the end supports 24a and 24b relative to the intermediate supports.

FIG. 10c illustrates deposition of a conformal sacrificial layer 19 on top of the structure from FIG. 10b. In order to ensure that the planarization step (FIG. 10d) leaves some sacrificial layer on top of the intermediate supports 27, the thickness of the sacrificial layer must be substantially greater that the sum of the thickness of the standoff layer 16 and the thickness of the spacer layer 18.

FIG. 10d illustrates planarization of the sacrificial layer 19 to a level above the top surface of the intermediate supports 27. The sacrificial layer 19 needs to be substantially flat after planarization with some sacrificial material left above the intermediate supports 27 to prevent attachment of the elongated-conductive reflective ribbon element 23b to the intermediate supports 27. Furthermore, in practice to improve the uniformity of planarization and ensure good attachment of the elongated-conductive reflective ribbon element 23b to the end supports 24a and 24b, it is preferable to pattern and remove the sacrificial layer 19 outside of the active region 8 (not shown in FIG. 10d).

FIG. 10e illustrates deposition of the ribbon layer 20 and of the reflective and conductive layer 22. The ribbon layer 20 does not make contact with the top surface of the intermediate supports 27 because of the sacrificial material present in the intermediate support gap 60. The elongated-conductive reflective ribbon elements 23a–23d are now patterned from the ribbon layer 20 and the reflective and conductive layer 22 using photolithographic processing and etching. This etching process defines the top-view geometry of the elongated-conductive reflective ribbon elements 23a–23d shown in FIG. 2.

FIG. 10f illustrates removal of the sacrificial layer 19 from within the active region 8 to reveal channels 25 and intermediate supports 27. This step also removes the sacrificial layer 19 from the intermediate support gap 60, thereby suspending the elongated-conductive reflective ribbon element 27 above the top surface of the intermediate supports 27. The elongated-conductive reflective ribbon element 23b is held in tension above the intermediate supports 27 by the two end supports 24a and 24b (not shown in FIG. 10f). The removal of the sacrificial layer 19 is the final step needed to produce operational devices.

The invention has been described in detail with particular reference to certain preferred embodiments thereof, but it will be understood that variations and modifications can be effected within the spirit and scope of the invention.

PARTS LIST 5a conformal grating device
5b conformal grating device
5c conformal grating device
5d conformal grating device
8 active region
10 substrate
12 bottom conductive layer
14 protective layer
16 standoff layer
18 spacer layer
19 sacrificial layer
20 ribbon layer
22 reflective and conductive layer
23a elongated-conductive reflective ribbon element
23b elongated-conductive reflective ribbon element
23c elongated-conductive reflective ribbon element
23d elongated-conductive reflective ribbon element
24a end support
24b end support
25 channel
27 intermediate support
28 gap
29 standoff
30 incident light beam
32 reflected light beam
35a $+1^{st}$ order beam
35b $-1^{st}$ order beam
36a $+2^{nd}$ order beam
36b $-2^{nd}$ order beam
51a subdivided elongated-conductive reflective ribbon element
51b elongated-conductive reflective ribbon element
51c subdivided elongated-conductive reflective ribbon element
51d subdivided elongated-conductive reflective ribbon element
52a subdivided elongated-conductive reflective ribbon element
52b subdivided elongated-conductive reflective ribbon element
52c subdivided elongated-conductive reflective ribbon element
52d subdivided elongated-conductive reflective ribbon element
55 subdivided gap
60 intermediate support gap

What is claimed is:

1. A method of manufacturing a conformal grating device, comprising the steps of:
    a) forming a spacer layer on a substrate;
    b) removing portions of the spacer layer to define an active region with at least two channels and at least one intermediate support, wherein the at least two channels and the at least one intermediate support define a grating period of the conformal grating device;
    c) forming a sacrificial layer in the active region;
    d) forming conductive reflective ribbon elements over the active region; and
    e) removing the sacrificial layer from the active region.

2. The method claimed in claim 1, wherein the sacrificial layer is formed by the steps of:
    c1) depositing the sacrificial layer over the substrate;
    c2) removing the sacrificial layer from the a top surface of the intermediate supports and areas outside of the active regions; and
    c3) planarizing the sacrificial layer to be substantially optically coplanar with the spacer layer and the top surface of the intermediate support.

3. The method claimed in claim 2, wherein the removal of the sacrificial layer from the active region leaves the conductive reflective ribbon elements attached to the top surface of the intermediate supports.

4. The method claimed in claim 2, wherein the planarizing step is performed by chemical mechanical polishing.

5. The method claimed in claim 1, further comprising the steps of:
    forming a standoff layer on the substrate prior to forming the spacer layer; and patterning the standoff layer in the active region to define a plurality of standoffs between the intermediate supports.

6. The method claimed in claim 5, wherein the removal of the sacrificial layer from the active region leaves the conductive reflective ribbon elements suspended above the intermediate supports.

7. The method claimed in claim 1, wherein the conductive reflective ribbons elements are formed by the steps of:
    d1) forming a ribbon layer over the substrate;

d2) forming a reflective conductive layer on the ribbon layer; and d3) patterning the reflective conductive layer and the ribbon layer to form conductive reflective ribbon elements over the active regions.

8. The method claimed in claim 5, wherein the step of forming a sacrificial layer in the active region leaves a portion of the sacrificial layer on a top surface of the intermediate support, and wherein the thickness of the sacrificial layer is substantially greater than a sum of the thickness of the spacer layer and the standoff layer.

9. The method claimed in claim 1, further comprising the step of forming an electrically conductive layer on the substrate prior to forming the spacer layer, and providing a contact to the electrically conductive layer.

10. The method claimed in claim 1, wherein the step of removing the sacrificial layer is performed by dry etching.

11. The method claimed in claim 1, wherein the intermediate support is fabricated to be completely hidden below the elongated conductive reflective ribbon elements.

12. The method claimed in claim 1, wherein the elongated conductive reflective ribbon elements are further subdivided.

13. The method claimed in claim 1, wherein the step of providing the bottom electrically conductive layer comprises the step of utilizing ion implantation.

14. The method claimed in claim 1, wherein the step of providing the bottom electrically conductive layer comprises the step of depositing a thin conductive film over the substrate.

15. The method claimed in claim 1, wherein the conductive reflective ribbon layer elements are tensile.

16. The method claimed in claim 1, wherein the sacrificial layer is deposited to be at least as thick as the spacer layer.

17. A method of manufacturing a conformal grating device, comprising the steps of:
  a) forming a conductive layer on a substrate;
  b) forming a standoff layer on the conductive layer;
  c) forming a spacer layer on the standoff layer;
  d) removing portions of the spacer layer to define an active region with at least two channels, leaving other portions of the spacer layer to define intermediate supports in the active region, wherein the at least two channels and the intermediate supports define a grating period of the conformal grating device;
  e) patterning the standoff layer in the active region to form a plurality of standoffs;
  f) depositing a sacrificial layer over the substrate;
  g) removing the sacrificial layer from the a top surface of the intermediate supports and areas outside of the active region;
  h) planarizing the sacrificial layer to a level substantially optically coplanar with the top surface of the intermediate supports;
  i) forming a ribbon layer over the substrate;
  j) forming a reflective conductive layer on the ribbon layer;
  k) patterning the reflective conductive layer and the ribbon layer to form conductive reflective ribbon elements over the active region; and
  l) removing the sacrificial layer from the active region.

18. The method claimed in claim 17, wherein the sacrificial layer is completely removed from the top surface of the intermediate supports and the removal of the sacrificial layer from the active region leaves the conductive reflective ribbon elements attached to the top surface of the intermediate supports.

19. The method of claim 17, wherein the substrate is selected from the group consisting of: glass, plastic, metal, and semiconductor material.

20. The method of claim 17, wherein the substrate is a semiconductor and the conductive layer is formed by doping the semiconductor substrate.

21. The method of claim 17, wherein the conductive layer is formed by depositing a thin conductive film over the substrate.

22. The method claimed in claim 17, wherein the spacer layer is selected from the group consisting of: silicon oxide, silicon nitride, and polyimide.

23. The method claimed in claim 17, wherein the sacrificial layer is selected from the group consisting of: silicon oxide, silicon nitride, polysilicon, doped-polysilicon, silicon-germanium alloys and polyimide.

24. The method claimed in claim 17, wherein the reflective conductive layer is selected from the group consisting of: aluminum, titanium, gold, silver, tungsten, silicon alloys and indium tin oxide.

25. The method claimed in claim 17, wherein the conductive layer is selected from the group consisting of: aluminum, titanium, gold, silver, tungsten, silicon alloys and indium tin oxide.

26. The method claimed in claim 17, wherein the ribbon layer is selected from the group consisting of: silicon nitride, titanium aluminide, and titanium oxide.

27. A method of manufacturing a conformal grating device, comprising the steps of:
  a) forming a conductive layer on a substrate;
  b) forming a standoff layer on the conductive layer;
  c) forming a spacer layer on the standoff layer;
  d) removing portions of the spacer layer to define an active region with at least two channels, leaving other portions of the spacer layer to define intermediate supports in the active region, wherein the at least two channels and the intermediate supports define a grating period of the conformal grating device;
  e) patterning the standoff layer in the channels to form a plurality of standoffs;
  f) depositing a sacrificial layer over the substrate;
  g) planarizing the sacrificial layer to a level above the a top surface of the intermediate supports;
  h) forming a ribbon layer over the substrate;
  i) forming a reflective conductive layer on the ribbon layer;
  j) patterning the reflective conductive layer and the ribbon layer to form conductive reflective ribbon elements over the active region; and
  k) removing the sacrificial layer from the active region.

28. The method claimed in claim 27, wherein the planarizing step includes partial removal of the sacrificial layer from the top surface of the intermediate supports.

29. The method claimed in claim 27, wherein the step of removing the sacrificial layer from the active region leaves the conductive reflective ribbon elements suspended above the intermediate supports.

* * * * *